Feb. 28, 1967 P. S. HOAGLAND 3,306,432
HELICAL STORAGE UNIT
Filed Oct. 21, 1965 7 Sheets-Sheet 2

INVENTOR.
PETER S. HOAGLAND
BY
Barnes, Kisselle, Raisch & Choate
ATTORNEYS

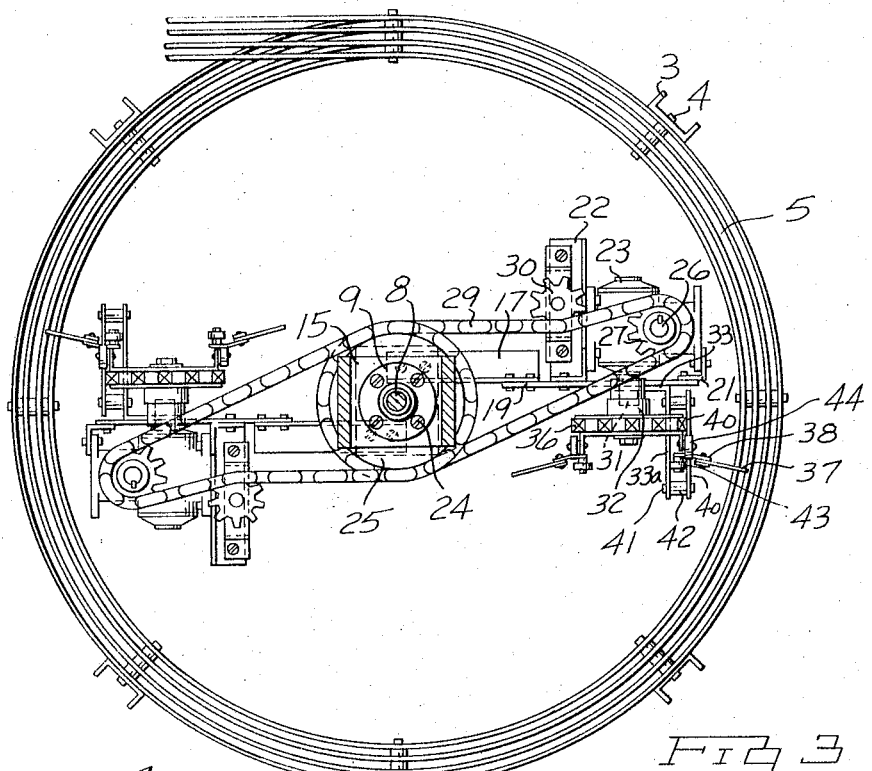

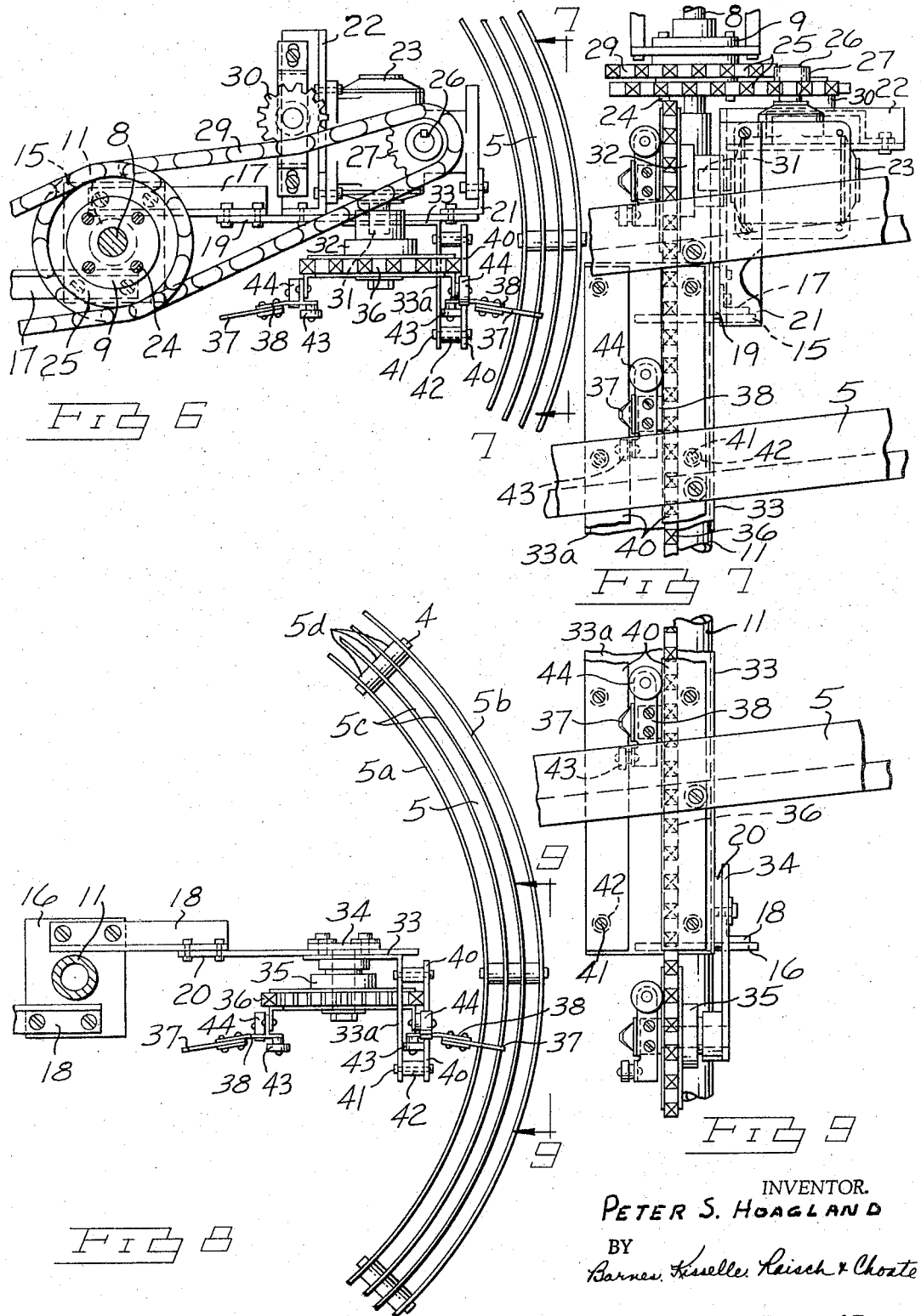

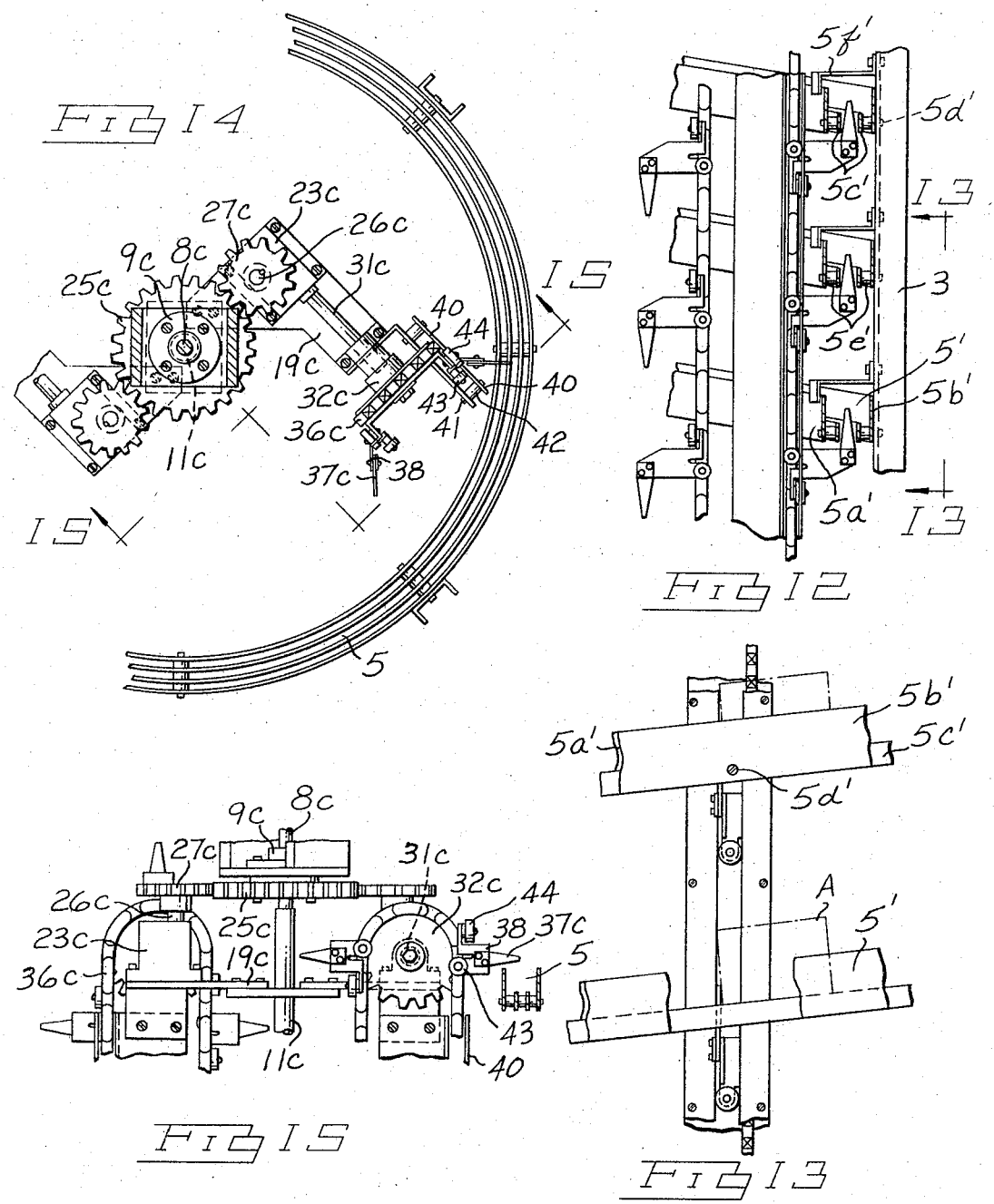

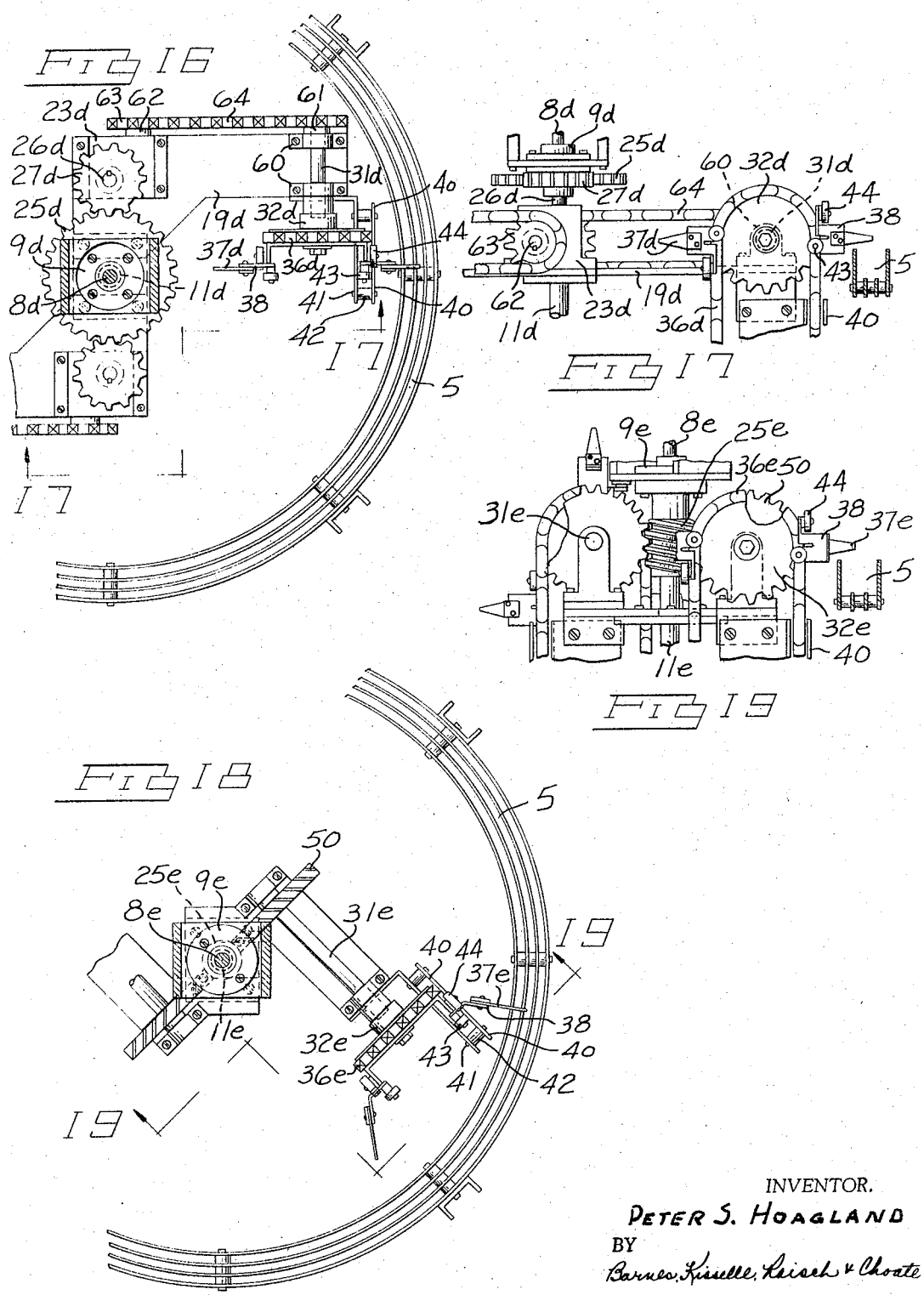

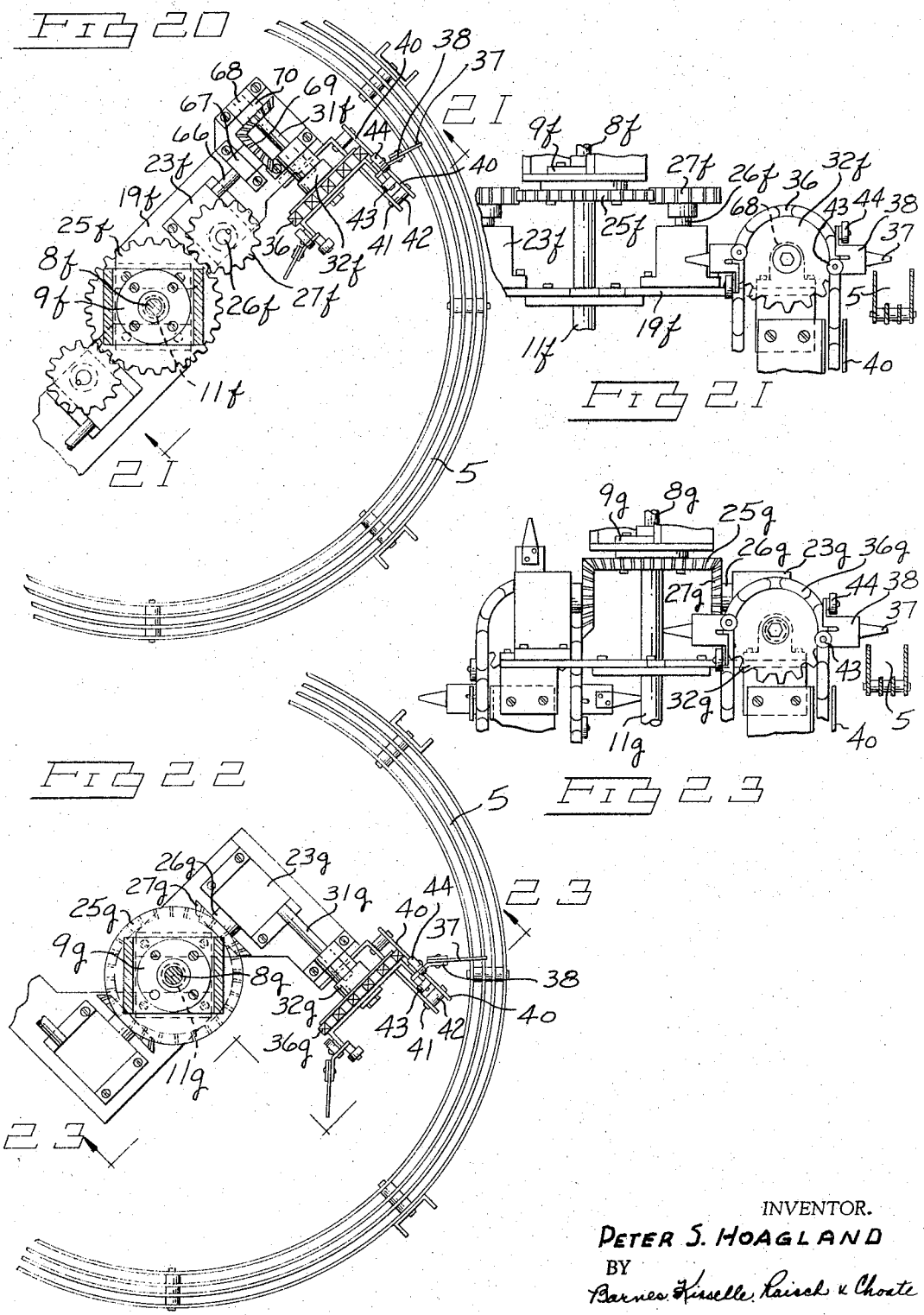

United States Patent Office 3,306,432
Patented Feb. 28, 1967

3,306,432
HELICAL STORAGE UNIT
Peter S. Hoagland, Lathrup Village, Mich., assignor to F. Jos. Lamb Company, Inc., Detroit, Mich., a corporation of Michigan
Filed Oct. 21, 1965, Ser. No. 499,550
10 Claims. (Cl. 198—212)

This invention relates to improvements in storage units. It is an object of the invention to provide a storage unit including a stationary helical runway, a spindle mounted for rotation coaxial with the runway, and planetary type means operated by rotation of the spindle for advancing propelling members along the runway throughout their passage therealong.

Another object of the invention is to provide such a storage unit including planetary type means for moving the propelling members a vertical distance equal to the pitch of the helical runway during each revolution of the spindle.

With these and other objects and advantages in view which will become apparent as the specification proceeds, the invention is hereinafter more fully described with the aid of the accompanying drawings, in which:

FIG. 1 is a side view, partly in section, of a helical storage unit embodying the present invention and FIG. 2 is a reduced plan view thereof.

FIGS. 3 and 4 are sections on the lines 3—3 and 4—4, respectively, of FIG. 1.

FIG. 6 is an enlarged partial view of FIG. 3.

FIG. 7 is a view on the line 7—7 of FIG. 6.

FIG. 8 is an enlarged partial view of FIG. 4.

FIG. 9 is a view on the line 9—9 of FIG. 8.

FIG. 12 shows another modification wherein the propelling members are upwardly directed.

FIG. 13 is a view on the line 13—13 of FIG. 12.

FIG. 14 is a modification showing another form of planetary drive.

FIG. 15 is a view on the line 15—15 of FIG. 14.

FIG. 16 shows another modified form of planetary drive.

FIG. 17 is a view on the line 17—17 of FIG. 16.

FIG. 18 is a further modified form of planetary drive.

FIG. 19 is a view on the line 19—19 of FIG. 18.

FIG. 20 is another modified form of planetary drive.

FIG. 21 is a view on the line 21—21 of FIG. 20.

FIG. 22 is yet another modified form of planetary drive.

FIG. 23 is a view on the line 23—23 of FIG. 22.

Figure 1:
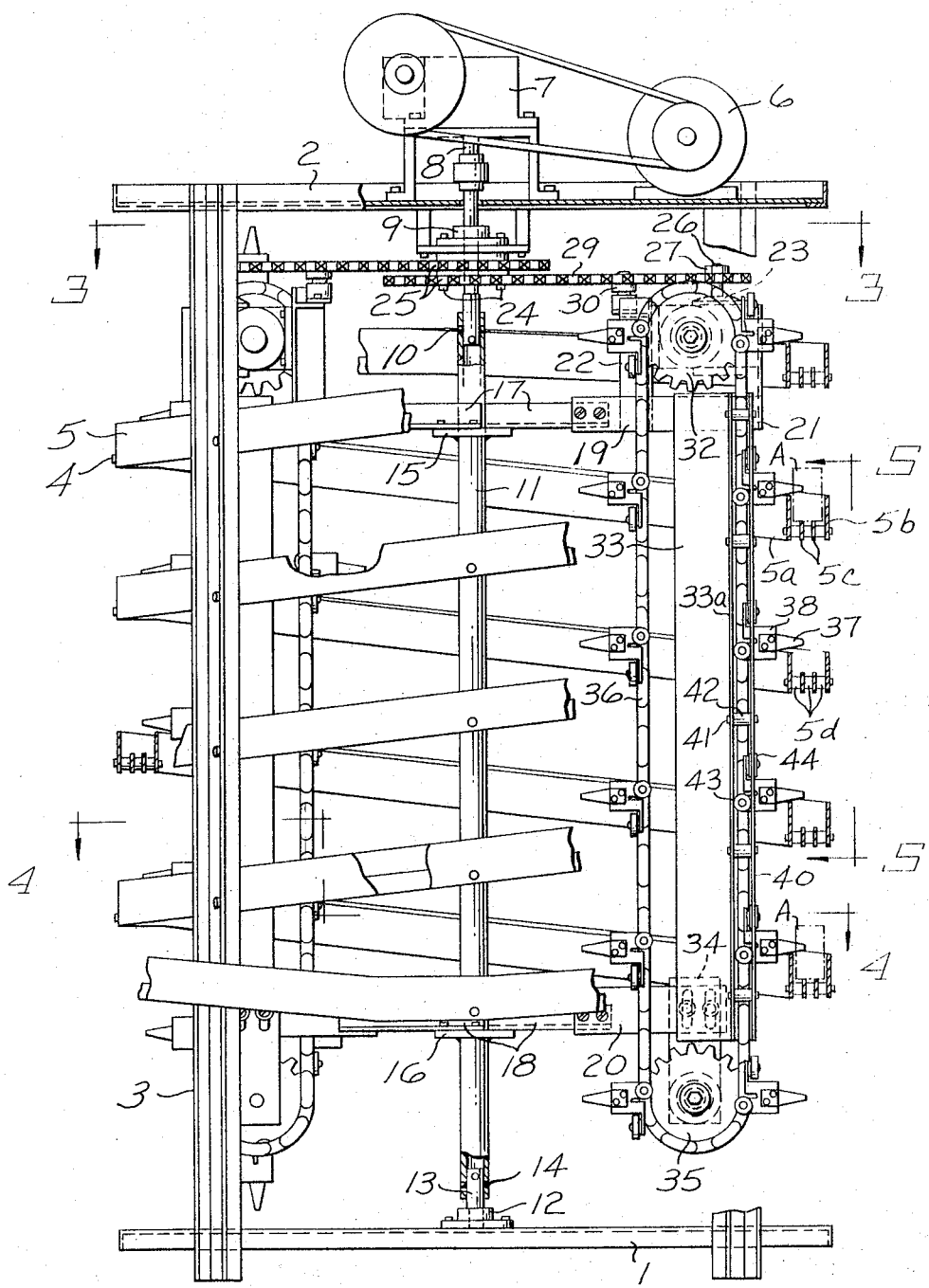
Figure 2:
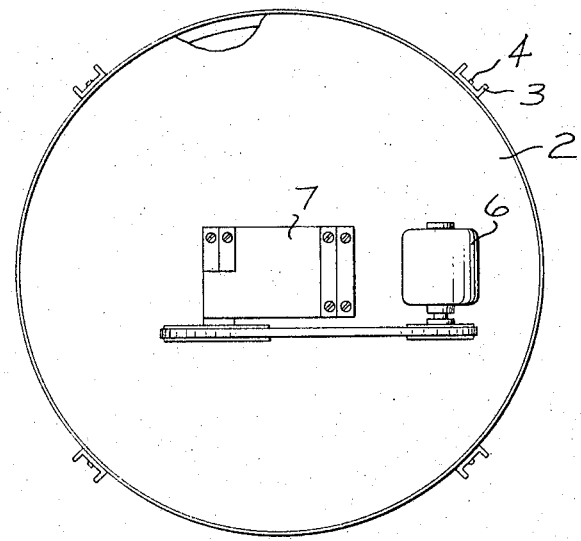

Referring first to FIGS. 1 to 9, inclusive, the frame includes a circular baseplate 1 coaxially above which a cap 2 is held by a plurality of circularly arranged supports 3 which are welded or otherwise suitably secured thereto. Supports 3 are welded also to the periphery of the baseplate and project downwardly beneath it for mounting in the floor (not shown). Secured as by bolts 4 to the inner faces of the supports 3 and extending throughout the major portion of the vertical distance between the baseplate and the cap is a helical runway 5 around which workpieces are adapted to be advanced upwardly in a manner hereinafter described. In the present instance the runway consists of inner and outer helically wound guide rails 5a and 5b, respectively, between which correspondingly wound carrier rails 5c of lesser height are provided. All the rails 5a, 5b and 5c are laterally spaced from one another throughout their length by spacers 5d. Bolts 4 extend through the spacers and all the rails. Mounted on the cap 2 is a suitable driving unit including a motor 6 and a speed reducer unit 7 driven thereby. The output shaft 8 of the speed reducer extends downwardly coaxially through the cap 2 and is mounted for rotation in a bearing 9 provided therein. Secured as by puddle welds 10 around the lower extremity of the shaft 8 is the upper extremity of a tubular spindle 11. Mounted coaxially on the baseplate 1 is a suitable bearing 12 which supports a stub shaft 13 for rotation, and around the upper extremity of the stub shaft and the lower extremity of the tubular spindle 11 another puddle weld connection 14 is provided.

Secured to the spindle 11 for rotation therewith adjacent its upper and lower extremities are upper and lower mountings 15 and 16 respectively. The upper mounting 15 is below the upper extremity of the runway 5 and the lower mounting 16 is below the lower extremity thereof. Projecting horizontally from opposite sides of the upper mounting 15 are parallel carriers 17 each of which is in vertical alignment with a carrier 18 projecting from one extremity of the lower mounting 16. Secured to and projecting outwardly from and parallel with each carrier 17 and 18 is a strap 19 and 20 respectively. An angle plate 21 is mounted on the outer extremity of each strap 19, and on each strap 19 intermediately of its length a bracket 22 is secured. A speed reducer unit 23 is supported by and between each angle plate 21 and the adjacent bracket 22. Secured coaxially around the spindle 11 to a stationary portion of the device, in the present instance to the bearing 9 as by bolts 24, is a sun member 25 which in this case is shown in the form of a double width sprocket, though if desired two separate sprockets may be substituted. Each speed reducer 23 includes an input shaft 26 projecting therefrom and having a sprocket 27 mounted thereon. A separate endless chain 29 extends around each sprocket 27, a conventional take-up sprocket 30, and one width of the sun member, so that when the spindle 11 rotates sprockets 27 are rotated about their own axes and revolved about the axes of the spindle 11. Each reducer unit 23 also has an output shaft 31 on which a sprocket 32 is secured. Angle members 33 extend vertically between the upper and lower straps 19 and 20 and hold them in spaced relation. A take-up plate 34 (FIG. 8) is also mounted on each strap 20 for vertical adjustment so that a lower sprocket 35 thereon may be adjusted the desired distance beneath one of the upper sprockets 32 to hold an endless chain 36 which extends around each vertically aligned pair of sprockets 32 and 35 taut. Projecting laterally outward at uniformly spaced intervals from each endless chain 36 and secured to the latter by chain attachment 38 are suitable resilient propelling members 37 which when extending outwardly from the outer flights of the chains are positioned to urge workpieces A upwardly along the runway 5 while the members projecting inwardly from the inner flights travel freely downward adjacent the spindle 11. Guide bars 40 are mounted on bolts 41 extending outwardly through the sides 33a of the angle members 33 and are spaced therefrom by spacers 42. Mounted for rotation on each chain attachment 38 is a roller 43 the diameter of which corresponds to the spacing between the side 33a of each angle member and the opposite guide bar 40. Other rollers 44 are also mounted on the chain attachments 38 and have their axes at right angles to those of the rollers 43. Thus the rollers 43 and 44 support the chain attachments 38 and the resilient propelling members 37 projecting outwardly therefrom and tend to limit the rearward deflection of the said propelling members. However if too great an accumulation of workpieces collects in front of the propelling members 37 the latter flex sufficiently rearwardly to travel forward past at least some of the workpieces.

Figure 10:
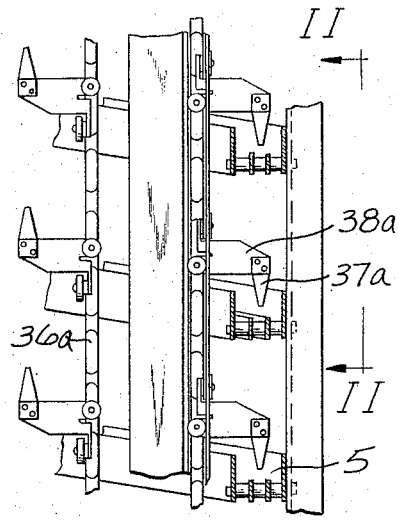
FIG. 10 shows a modification with the propelling members downwardly directed.
Figure 5:
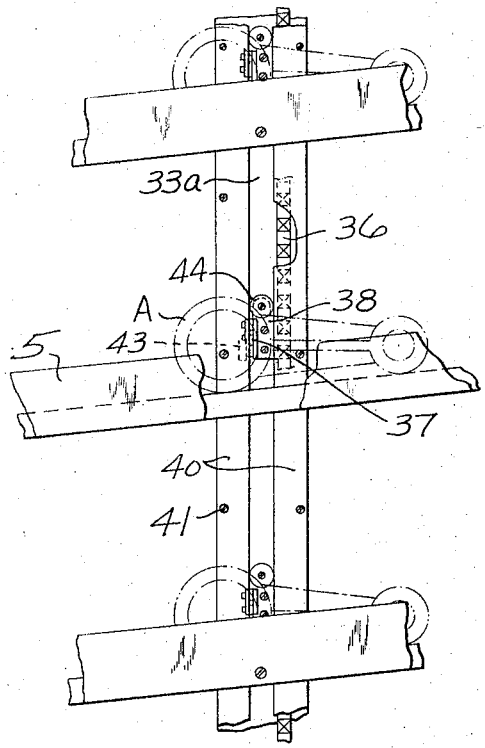
FIG. 5 is an enlarged view on the line 5—5 of FIG. 1.
Figure 11:
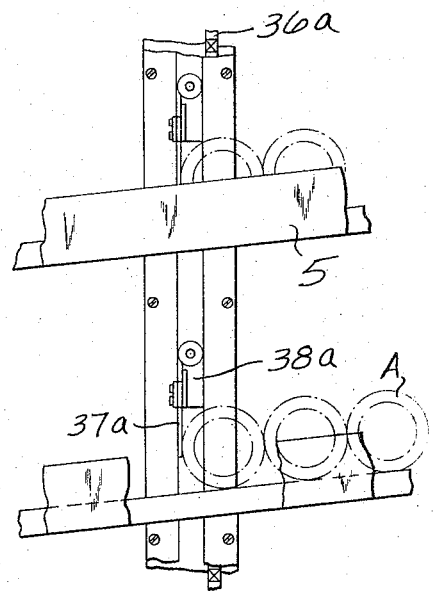
FIG. 11 is a view on the line 11—11 of FIG. 10.

In FIG. 1 it will be noted that the resilient propelling members 37 secured by chain attachments 38 to the outer flights of the chains 36 normally travel substantially radially around upon the inner guide rails 5a and urge workpieces along the helical runway 5. If too many workpieces accumulate in front of any one propelling member 37 the latter becomes sufficiently flexed rearwardly relative to its direction of travel to advance past at least some of the workpieces on the runway. In the slight modification shown in FIGS. 10 and 11 the chain attachments 38a project from the outer flights of the chains 36a over the helical runway and depending from the attachments are propelling members 37a which are adapted to advance workpieces along the runway as the spindle is rotated. In FIGS. 12 and 13 another slight modification is shown wherein the runway 5' consists of inner and outer guide rails 5a' and 5b' between which two parallel carrier rails 5c' are provided. Each carrier rail is held in spaced relation to the guide rail adjacent thereto by a plurality of bolts 5d' having spacers 5e' thereon intermediately of their length. In order to retain the guide rails uniformly spaced throughout their length a series of offset brackets 5f' extend between the inner guide rails 5a' and the supports 3.

In storage units it is sometimes very desirable to continuously advance a relatively large number of workpieces up a helical runway so that they maintain a substantially constant speed. To obtain this result and normally insure uniform speed of the propelling members the use of planetary driving means has many advantages. In FIGS. 1 to 9, inclusive, the sun member 25 is shown in the form of a stationary sprocket coaxial with the spindle 11. An endless chain 29 extends around each input sprocket 27 and around the sun member 25 for a portion of its width so that as the input sprockets 27 are rotated they revolve about the axis of the sun member. The modifications shown in FIGS. 14 to 23, inclusive, show somewhat different forms of planetary driving means for the vertical chains 36 which travel around the vertically spaced pairs of sprockets 32 and 35. However as the lower sprockets 35 are merely idler or tail sprockets they are not included in these views.

In the modification shown in FIGS. 14 and 15 the upper extremity of the vertical spindle 11c is, as heretofore, dependingly secured to the shaft 8c mounted for rotation in the bearing 9c. Two pairs of sprockets each including an upper sprocket 32c and a lower sprocket (not shown) beneath it are uniformly spaced from the axis of the spindle 11c, and mounted for rotation around each vertically spaced pair of sprockets is an endless chain 36c. Opposed upper straps 19c are secured to the spindle for rotation therewith, and mounted on each upper strap is a speed reducer unit 23c having an output shaft 31c projecting therefrom on each of which one of the upper sprockets 32c is secured. Extending from each speed reducer unit is also an input shaft 26c having a gear 27c thereon. Each of the gears 27c meshes with the stationary sun member or gear 25c which is coaxial with the spindle 11c and is secured to one face of the bearing 9c. Thus rotation of the gears 27c around the sun member 25c as the spindle 11c turns results in helical movement of the propelling members 37c around the runway 5. It will also be noted that the planetary arrangement employed raises the outer flights of the endless chains 36c a distance equal to the pitch of the runway during each revolution of the spindle 11c.

FIGS. 16 and 17 show another slight modification of the means for imparting helical movement to the propelling members 37d whereby during each revolution of the spindle 11d all the propelling members on the outer flights of the chains are raised vertically a distance equal to the pitch of the helical runway. In this modification a vertical bearing 9d supports an output shaft 8d from a source of power and dependingly secured to the said shaft for rotation therewith is a vertical spindle 11d. Mounted for rotation with the spindle are upper straps 19d on each of which a speed reducer unit 23d is mounted, and projecting from each of the latter is an input shaft 26d having a gear 27d thereon which meshes with the stationary sun member, gear 25d, coaxial with and secured to the bearing 9d. Two aligned bearings 60 which support an output shaft 31d are mounted on each strap 19d. On one extremity of each of the shafts 31d is an upper sprocket 32d and on the opposite extremity thereof is a sprocket 61. Projecting also from each reducer unit 23d is a shaft 62 parallel with its output shaft 31d and having a sprocket 63 on its outer extremity. An endless chain 64 extends around each aligned pair of sprockets 61 and 63.

FIGS. 18 and 19 show another slight modification wherein a worm 25e is secured to and coaxial with the bearing 9e through which the shaft 8e extends. Mounted on the output shafts 31e on which the upper sprockets 32e for the endless chains 36e are secured are also worm wheels 50 which mesh with the worm 25e so that upon rotation of the shaft 8e and the spindle 11e around the axis of the latter the endless chains 36e are moved by rotation of the sprockets 32e. Again the propelling members 37e extending from the chains 36e travel a vertical distance equal to the pitch of the helical runway 5 during each revolution of the spindle 11e. In this instance it will be seen that no speed reducer units are employed since the worm 25e and the worm wheels 50 are relatively so proportioned to perform that function; it is of course also understood that the worm 25e is at all times held stationary.

In the modification shown in FIGS. 20 and 21 a bearing 9f again supports a vertical shaft 8f for rotation and dependingly secured to the latter to rotate therewith is a spindle 11f. Secured coaxially to the bearing 9f is a stationary sun member 25f in the form of a spur gear. Speed reducer units 23f are mounted on the straps 19f rotatable with the spindle 11f. A spur gear 27f is mounted on the input shaft 26f of each speed reducer unit and each gear 27f meshes with the stationary sun member 25f so that upon rotation of the spindle 11f the input gears 27f rotate around the sun member 25f. A shaft 66 extends from each reducer unit 23f. These shafts 66 are disposed at right angles to the output shafts 31f on each of which one of the upper sprockets 32f is mounted. Suitable bearings 67 and 68 which support the shafts 66 and 31f, respectively, for rotation are secured on each strap 19f for rotation with the spindle 11f. Bevel gears 69 and 70 on the shafts 66 and 31f, respectively, are in constant mesh with one another.

In the modification shown in FIGS. 22 and 23 the arrangement is again very similar. The output shafts 31g on which the upper sprockets 32g for the endless chains 36g are mounted terminate in separate speed reducer units 23g. The input shafts 26g projecting from the reducer units are in alignment with one another and terminate at their adjacent extremities in bevel gears 27g. Both the latter mesh with the sun member 25g which is in the form of a stationary bevel gear coaxially secured to the bearing 9g through which the shaft 8g extends, so that upon rotation of the spindle 11g both the input gears 27g rotate about the stationary sun gear 25g and impart equal rotary movement simultaneously to both endless chains 36g.

It will be noted that in all cases a central rotary spindle 11 is provided on which vertically spaced pairs of sprockets 32 and 35 are supported. Around each pair of sprockets an endless chain 36 is vertically movable while the sprockets are horizontally movable with the rotation of the spindle 11. In all cases shown each unit includes only two vertically spaced pairs of sprockets disposed at 180 degrees to one another, though it is understood that larger units may include a greater number of pairs of sprockets uniformly circularly spaced from one another and each pair having a vertical chain extending around them. It will also be noted in FIGS. 14 to 23, inclusive, that in several cases only one of the upper sprockets and no lower sprockets are shown though of course two upper and two lower sprockets are employed in all cases.

It is understood that any preferred form of chuting may be connected to the lower extremity of the runway 5 for the delivery of workpieces thereonto, and other chuting may also be secured to the upper extremity of the runway for discharge therefrom.

It will thus be seen that the drive arrangements herein disclosed for the endless chains on which the propelling members are mounted are capable of transmitting heavy loads as distinguished from arrangements wherein the vertical travel of these chains is controlled by engaging a guide on the helical runway. Thus the storage unit of this invention is admirably suited where heavy workpieces or large installations are involved.

I claim:
1. A storage unit comprising a frame, a vertical spindle mounted for rotation thereon, means for rotating the spindle, a helical runway secured to the frame coaxial with the spindle, vertically aligned pairs of sprockets supported by the spindle and mounted radially to the axis of the spindle for rotation about horizontal axes, an endless chain extending around each vertically aligned pair of sprockets, propelling members projecting from the chains for urging workpieces around the helical runway, a stationary sun member secured to the frame coaxial with the spindle, and means mounted on the spindle for rotation around the sun member and forming a driving connection between the sun member and sprockets whereby the endless chains are moved a vertical distance equal to the pitch of the helical runway during each revolution of the spindle.

2. The combination in claim 1, wherein the sun member consists of a worm and the last mentioned means are worm wheels meshing with it.

3. A storage unit comprising a frame, a vertical spindle mounted for rotation thereon, means for rotating the spindle, a helical runway secured to the frame coaxial with the spindle, vertically aligned pairs of sprockets supported by the spindle and mounted radially to the axis of the spindle for rotation about horizontal axes, an endless chain extending around each vertically aligned pair of sprockets, propelling members projecting from the chains for urging workpieces around the helical runway, a stationary sun member secured to the frame coaxial with the spindle, an output shaft projecting from one of each pair of sprockets, input shafts, means on each input shaft for engaging the sun member as it is driven around the latter, and means connecting each output shaft with its input shaft whereby each revolution of the spindle moves the chains a vertical distance equal to the pitch of the runway.

4. A storage unit comprising a frame, a vertical spindle mounted for rotation thereon, means for rotating the spindle, a helical runway secured to the frame coaxially with the spindle, vertically spaced pairs of sprockets mounted on the spindle for rotation about horizontal axes, an endless chain extending around each of said pair of sprockets, propelling members projecting from the chains for urging workpieces around the helical runway, a stationary sun member secured to the frame coaxial with the spindle, speed reducer units mounted on the spindle, an output shaft connecting each pair of sprockets with one reducer unit, an input shaft extending from each reducer unit, and means on the input shafts coacting with the sun member for rotating said shafts around said sun member when the spindle is rotated.

5. The combination in claim 4, wherein the propelling members are resilient.

6. The combination in claim 4, wherein the sprockets of each pair are mounted adjacent opposite extremities of the spindle.

7. A storage unit comprising a frame, a vertical spindle mounted for rotation thereon, means for rotating the spindle, a helical runway secured to the frame coaxial with the spindle, vertically aligned pairs of sprockets supported on the spindle and mounted radially relative to the spindle for rotation about horizontal axes, an endless chain extending around each pair of vertically aligned sprockets, propelling members projecting outwardly from the chains for urging workpieces around the helical runway, a stationary sun member secured to the frame coaxial with the spindle, speed reducer units mounted on the spindle, an output shaft connecting one of each pair of sprockets to each reducer unit, an input shaft extending from each reducer unit, and a gear on each input shaft meshing with the stationary sun member whereby said gears rotate simultaneously around said sun member upon rotation of the spindle.

8. The combination in claim 7, wherein the gears on the input shafts and the sun member have coacting spur teeth.

9. The combination in claim 7, wherein the gears on the input shafts and the sun member have coacting bevel teeth.

10. A storage unit comprising a frame, a vertical spindle mounted for rotation thereon, means for rotating the spindle, a helical runway secured to the frame coaxial with the spindle, vertically opposed pairs of sprockets mounted on the spindle for rotation about horizontal axes, an endless chain extending around each pair of vertically opposed sprockets, propelling members projecting outwardly from the chains for urging workpieces around the helical runway, a stationary sun member secured to the frame coaxial with the spindle, speed reducer units mounted on the spindle, an output shaft connecting one of each pair of sprockets with one reducer unit, an input shaft extending from each speed reducer unit, a sprocket on each input shaft, the sun member having sprocket teeth around it and a separate endless chain extending around the sun member and each of the sprockets on the input shafts, whereby upon rotation of the spindle the propelling members are moved helically along the runway.

References Cited by the Examiner
UNITED STATES PATENTS
3,071,240  1/1963  Graham _____ 198—171

EVON C. BLUNK, *Primary Examiner.*

R. E. AEGERTER, *Assistant Examiner.*